Dec. 22, 1959　　　　　L. H. SPRAGUE　　　　2,917,929
DRIVE INTERCONNECTION FOR CULINARY APPLIANCES
Filed Oct. 13, 1955　　　　　　　　　　2 Sheets-Sheet 1

INVENTOR.
Lindol H. Sprague.
BY
Wood, Herron & Evans,
ATTORNEYS.

Dec. 22, 1959           L. H. SPRAGUE          2,917,929
DRIVE INTERCONNECTION FOR CULINARY APPLIANCES
Filed Oct. 13, 1955                                2 Sheets-Sheet 2

INVENTOR.
Lindol H. Sprague.
BY
Wood, Herron & Evans.
ATTORNEYS.

United States Patent Office 2,917,929
Patented Dec. 22, 1959

2,917,929

DRIVE INTERCONNECTION FOR CULINARY APPLIANCES

Lindol H. Sprague, Cincinnati, Ohio, assignor to NuTone, Inc., Cincinnati, Ohio, a corporation of New York Application October 13, 1955, Serial No. 540,226

1 Claim. (Cl. 74—16)

This invention relates to appliances which are used in kitchens in the preparation of foods, and it is directed in particular to improved means for coupling a power unit, such as an electric motor, to culinary appliances, such as mixers, beaters, blenders, etc.

The majority of power driven culinary appliances fall within two general categories. One category includes appliances, such as those used to mix or beat foods, which are designed to operate in a low speed range, whereas the other includes appliances, such as a blender, which are designed to operate in a high speed range. The two ranges of speed are substantially different, and the average speed of the higher one may be between fifteen to twenty times greater than the average speed of the slower one. With few exceptions, culinary appliance manufacturers have in the past provided two different types of motors to drive the two different types of appliances, which meant, of course, that a person had to pay for two motors in order to have a complete set of appliances. One such exception is disclosed in copending patent application Serial No. 409,372, filed February 10, 1954, now Patent No. 2,841,723. In this application there is disclosed a power unit which has a drive connector at the one end to which may be attached a plurality of low speed appliances and which has at the opposite end a second drive connector to which may be attached those appliances designed to operate within the high speed range. The housing of the power unit is constructed so that it selectively may be stood up upon one end or upon the other end in order to expose the drive connector which is to be used in a particular instance. Although the power unit of the copending application fulfills its intended functions, it nevertheless necessitates considerable handling of the unit in changing back and forth from one type of drive to the other.

It is one of the objectives of the present invention to provide improved means for coupling an electric motor to a plurality of both high and low speed appliances so that only one motor is required and so that it is unnecessary, as in the unit of the copending application, to change the position of the motor unit to make the desired one of two speeds available.

A further objective of the invention is to provide two speed coupling means which may be disposed at the top center of the housing for the driving motor so that the housing may serve as a stable base for appliances which are driven by the motor.

Another objective of the invention is to provide a driving connection of the type set forth which is so constructed that there is no interference between the selected drive and the drive which is not being used in a particular instance.

An additional objective of the invention is to provide a two speed driving coupler having two rotating parts arranged such that one of the parts comprises a journal and a self lubricating bearing for the second one of the parts.

Another objective is to provide a two speed coupler for an electric motor which serves the additional function of providing a self lubricating bearing for one end of the rotor of the electric motor.

A further objective of the invention is to provide a two speed driving interconnection to which attachments designed for a plurality of different functions may be readily attached and detached in driving relationship with respect to a selected one of two drive members.

Other objects and advantages of the invention will be readily apparent to those skilled in the art from the following detailed description of the drawings in which.

Figure 3:
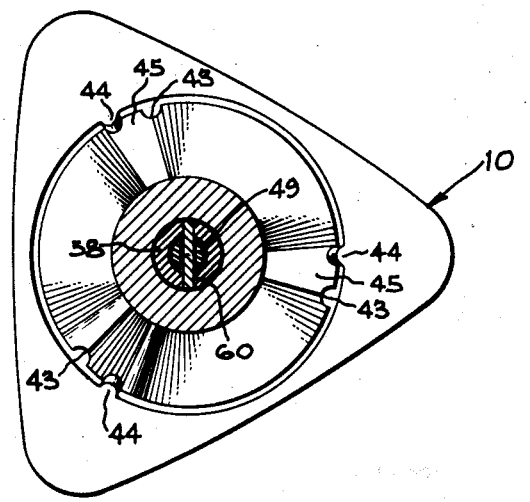
Figure 3 is a cross sectional view taken on the line 3—3 in Figure 1.
Figure 4:
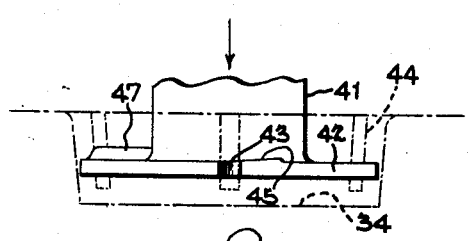
Figures 4 through 6 are fragmentary views illustrating diagrammatically a preferred means for fastening an appliance to the power unit.
Figure 5:
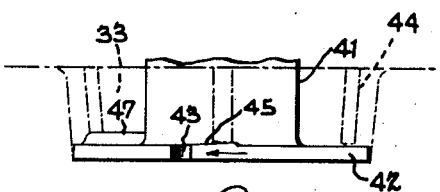
Figure 6:
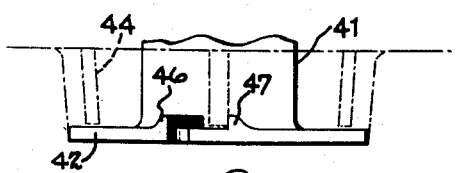

In the drawings, the numeral 10 designates a motor housing. This housing, as may be seen from Figure 3, is substantially triangular in shape as viewed from above. The specific shape of the housing is, however, of little importance to the present disclosure, and it will be readily apparent that the elements of the invention may be incorporated in any power unit or used in conjunction with any power source wherein it is desired to provide two drive couplers in one location, and particularly under circumstances in which the couplers rotate at different speeds relative to one another.

The motor housing shown is particularly suited for use in conjunction with culinary appliances, because it provides a broad base, having a low center of gravity to serve as a stable support for such appliances. In the prsent instance, the bottom of the housing has a plurality of pads 11 affixed to it, which pads are made of resilient material such as rubber to absorb vibrations. Although not shown in detail here, an electric motor consisting of a conventional stator and rotor assembly 12 are mounted in the lower portion of the housing. A bearing for the lower end of the motor is indicated generally at 13. Means such as a control knob (not shown) may be mounted at the outside of the casing and connected with the electric system of the motor so as to provide speed adjustments within the two ranges available at the drive couplers of the unit.

In general, the housing of the unit consists of two parts, including the lower part which encases the motor and an upper part 14. The upper part of the housing serves the double function of providing an interlocking support for culinary appliances and of providing an enclosure for a gear speed reducing system.

The motor is mounted with the axis of the armature shaft extending vertically through the center of the power unit. The lower end of the armature shaft is journalled in bearing 13 following conventional practices. The driving end of shaft 15 extends upwardly through an upper wall 16 of the lower part of housing 10. Immediately above the wall 16 a spur gear 17 is provided which may be made as shown by machining splines in drive shaft 15. Spur gear 17 meshes with a large gear 18, the latter gear being an idler. The gear 18 is journalled on stud shaft 19 which is supported at its lower end in a bushing 20 mounted in wall 16 at one side of drive shaft 15. The upper end of stud shaft 19 is also mounted in a bushing designated 21 which is seated within a boss 22 formed within the upper part 14 of the housing. The large gear 18 has a pinion gear 23 mounted upon its upper face and this pinion is securely affixed to gear 18 so as to turn with it. In the instance shown, the pinion 23 has an integral sleeve 24 which extends through the center of gear 18 surrounding stub shaft 19. Pinion 23 is in mesh with a second large gear 25. This latter gear has an enlarged central opening therein which is configurated so that it keys to a clutch element 26, the clutch element having its lower end press fitted into the central opening. The drive shaft 15 is of reduced diameter above spur gear 17 so as to provide a shoulder 27. The clutch element 26 has a central bore 28 therein which is of such a diameter so as to fit the reduced diameter of shaft 15 above the shoulder in slip fit relationship with the clearance between the clutch element and the shaft being such that the clutch element constitutes a bushing for shaft 15.

The clutch element 26 is in turn rotatably journalled within a cylindrical bushing 29, which bushing is press fitted into a boss 30 which depends from the underside of the upper wall of the housing part 14. In the preferred embodiment, the latter bushing is made out of stainless steel. The journal assembly at the upper end of the motor unit thus comprises the boss 30, which has the stainless steel bushing 29 mounted in it, the bushing 29 which journals the clutch element 26, and the clutch element which, when the motor is running, rotates at a slow rate of speed due to the reduction gearing. The clutch element 26, on the other hand, serves as a bushing for the upper end of the drive shaft 15 which when the motor is running, rotates at a high rate of speed. It will be noted that the drive shaft rotates in the same direction of rotation as the clutch element so that the surface speed of the drive shaft relative to the clutch element is the difference between the respective high and low speeds and not the sum of these two speeds as would be the case were the direction of the drive shaft reversed with respect to the direction of rotation of the clutch element. To serve the journal function, the clutch element is made, following known powdered metallurgy techniques, to carry its own lubricant supply. A metal suitable for this purpose may be purchased under the trade name "Oilite." Hence, the clutch element 26 serves three functions, the first being that of one-half of a claw clutch assembly to drive slow speed appliances, the second being that of providing a self-lubricating bearing for the drive shaft of the motor, and the third being that of providing a self lubricating journal for itself within the bushing 29.

Figure 2:
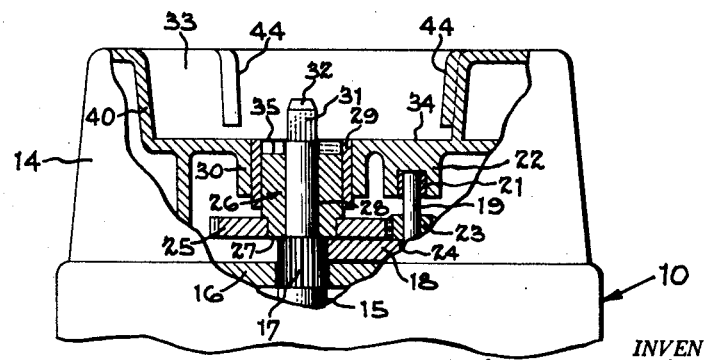
Figure 2 is a view of the upper part only of the power unit shown in Figure 1, in this instance the unit being shown with the mixer disengaged.

As may be seen from Figure 2, the upper end of drive shaft 15 has an extension 31 on it which is square in cross section so that it may be received in a complementary socket of a high speed appliance to drive the same. The upper end of the extension 31 may be bevelled as shown at 32 to facilitate the engagement of the shaft into such a socketed drive connection. It is believed to be unnecessary to illustrate a specific example of such a socketed coupler inasmuch as the required construction is obvious from the illustrated shape of the extension, the only requirement being that it conform generally to this shape to form a positive drive coupling.

Figure 7:
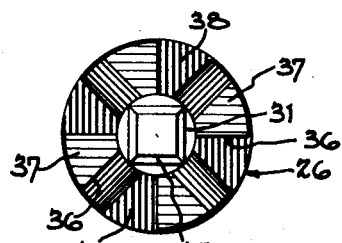
Figure 7 is a top plan view of the clutch part only of the power unit.

Both drive couplers are located in the center of a well 33 which is formed in the top of the motor housing. This well is described in detail at a later point in the specification. In passing, however, it will be noted that the bottom wall 34 of the well 33 is substantially planar and that teeth 35 which are at the upper end of the clutch element 26 are recessed with respect to the plane of this wall whereas the extension 31 of the drive shaft projects above the plane of this wall. Four clutch teeth are employed in the preferred embodiment as may be seen from the top plan view of Figure 7. The teeth are symmetrically arranged around the central axis of the clutch element with each tooth comprising a flat face 36 which is in a plane extending radially from the central axis of the clutch element, a land 37 which is in a horizontal plane, and a slanting face 38 which extends downwardly from the side of the tooth opposite to the flat face 36. As will be apparent from Figure 1, the four teeth are designed to receive four complementary teeth of a second clutch element such as the one designated 39 in Figure 1. The latter clutch element is in driving connection with the operating parts of a slow speed appliance as will be explained later.

It will be appreciated, therefore, that the upper end of the drive shaft 15 rotates at the speed of the motor, whereas the clutch element 26 operates at a substantially reduced rate of speed due to the gear reduction system provided by the gear transmission. In the preferred embodiment, this reduction is approximately 18 to 1. Thus, with a top motor speed of approximately 16,000 to 18,000 revolutions per minute, the top speed of the lower range is approximately 900 and 1000 revolutions per minute, which top speeds are generally recognized to be more than adequate to fulfill the intended functions of the appliances designed for the respective speed ranges.

Figure 1:
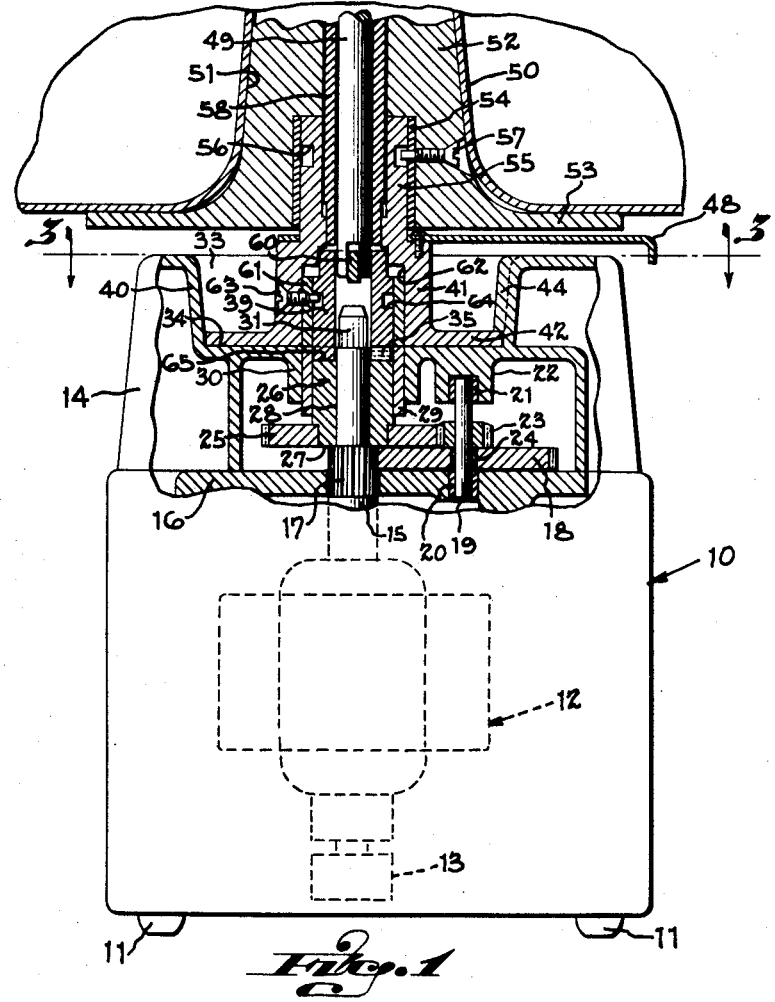
Figure 1 is a side view of a power unit embodying the principles of the present invention showing it in driving engagement with a mixer appliance. In this view a fragment only of the mixer appliance is shown in cross section, and the upper portion of the unit is also shown in section to illustrate details of construction.

The construction of the upper part 14 of the housing, and particularly the well 33 which is provided has several advantages. For one thing it recesses the exposed end 31 of the drive shaft, and secondly it provides a locking seat for the bases of the appliances which are used in conjunction with the power unit. In addition, the side wall 40 of the well tapers inwardly and downwardly slightly to facilitate the centering of an appliance to be coupled to the unit. In the preferred embodiment the appliances are supported as shown in Figure 1 upon a pedestal 41 having a circular base flange 42. The periphery of the base flange 42 has, in the instance shown, three semi-circular notches 43 formed in it which are spaced circumferentially from one another 120 degrees. The tapering side wall of the well 33 has three upright ribs 44 formed on it which are also semi-circular in cross section to conform generally to the shape of the notches 43. It will be observed from Figures 2 and 4–6 that the lower ends of ribs 44 terminate short of the bottom wall 34 of the well by an amount just slightly greater than the thickness of base flange 42 of the pedestal. Thus, the pedestal may be placed into the well when the notches 43 are aligned with the ribs 44. The flange has adjacent to each of the two notches a wedge surface 45 which in each case tapers upwardly away from the notch in a direction counter-clockwise of the base flange as viewed in Figure 3. The third notch has a pair of stops 46 and 47 associated with it. One of these stops is located at the notch on the side thereof which is in a clockwise direction from the notch as viewed in Figure 3. The other stop is spaced from the first one approximately 20 degrees in a direction counter-clockwise therefrom. Thus, when the notches are aligned respectively with the ribs, the pedestal may be lowered into the well to rest upon the bottom wall 34 of the well. The pedestal then may be rotated by means such as a handle 48 in a clockwise direction as viewed from above to bring the two slanting surfaces 45 into wedging contact with the underside of the respective ribs which locks the pedestal in place. Rotation in the opposite direction is prevented by the stop 46. The stops 47 prevent the pedestal from being forcibly turned so far as to move the wedge surfaces beyond and out from under the ribs. However, to do this the wedge surfaces would have to be very badly worn and the person attaching the attachment would have to exert an unusual amount of force. Hence, the stop 47 is only a safety device and does not have to make contact with a rib to serve as a stop except under unusual circumstances.

The attachment which is shown in Figure 1 is for a mixer of the type disclosed in copending patent application Serial No. 409,371, filed February 10, 1954, now Patent No. 2,798,700. In general, this mixer comprises a beater head (not shown) which is driven through reduction gearing by a shaft 49. A mixer bowl 50, only a portion of which is shown here, is provided which is shaped something like an angel food cake pan in that it has a central tubular portion 51 which rises from the center of the bottom of the bowl to a point adjacent to the upper rim of the bowl. The central tube tapers upwardly and engages over a mandrel 52 which is formed as an integral part of a turntable 53 upon which the bowl seats. The turntable is driven such that it rotates in a direction opposite to the direction of rotation of the mixer paddles of the beater head. In this way, all of the food which is being mixed in the bowl is presented to the paddles which depend from the beater head into the bowl at one side of the central tubular portion thereof.

The turntable must be free to rotate relative to the pedestal 41. For this purpose the turntable has a substantially large cylindrical bore which is centered in its underside. A bushing 54 resides within the bore and it serves to journal the upper end 55 of the pedestal which is cylindrical. To hold the pedestal to the turntable, the upper portion of the pedestal within bushing 54 has a circumferential groove 56 machined into it. A metal screw 57 which extends radially inwardly through the side of the turntable is provided with a plain inner end which rides within the groove 56 and thus prevents withdrawal of the turntable from the pedestal. The center of the upper end of the pedestal also has a vertical bore therein which is substantially larger than drive shaft 49 so as to receive a tubular connector 58. This connector is keyed to the pedestal at its lower end and is keyed to the beater head at its upper end, in this way it prevents rotation of the beater head which would otherwise occur as a result of the torque applied to it by drive shaft 49.

The mixer operates within the low speed range and thus the drive connection to it is through the speed reduction gear train and the "Oilite" clutch element 26. Hence, the mating clutch element 39 is hollow so as to clear the upper end 31 of the drive shaft 15 of the electric motor. The hollow bore in the center of the clutch member 39 extends all of the way through with the upper end thereof being sufficiently large to receive the lower end of drive shaft 49 of the mixer. The clutch element 39 is keyed to drive shaft 49 by means of a cross bar 60 which is secured at its opposite ends in slots provided at diametrically opposed sides of the upper end of clutch element 39. The lower end of shaft 49 is also slotted so as to straddle the cross bar 60; and, to assist in the engagement of the drive shaft over the cross bar, the upper edges of the bar may be bevelled as shown in Figure 1. Clutch element 39 is rotatably journalled within a stainless steel bushing 61 which is press fitted into an internal bore 62 provided in pedestal 42. This clutch element also is self lubricating, being made preferably of "Oilite" powdered metal. A metal screw 63 similar to the metal screw 57 is used to lock the clutch element 39 in place inside of bushing 61. In this instance, an annular groove 64 is provided in the clutch element and it receives the inner end of the metal screw 63 which threads through the side wall of the pedestal and through the bushing 61 so as to present a plain inner end to the groove 64. The clutch teeth 65 on the underside of the clutch element 39 project downwardly beyond the plane of the undersurface of the base flange 42 of the pedestal so as to make engagement with the complementary teeth which are part of clutch element 26.

From the foregoing description of the embodiment of the invention disclosed in the drawings, it will be apparent that the combination clutch and bearing device of this invention may be incorporated in many different types of power units in addition to the specific one illustrated. An example of such an installation is disclosed in copending patent application Serial No. 550,139, filed November 30, 1955, now Patent No. 2,868,025, wherein the device is used in a kitchen appliance motor unit adapted to be mounted in a kitchen counter such that the top of the unit is flush with the upper surface of the counter. In such an installation, the drive couplers may be hidden from view by means of a cap or plug when the unit is not in use.

I claim:

In an electrical motor for driving selectively high or low speed appliances, said electrical motor having a drive shaft which is arranged vertically, a housing enclosing said motor, a well at the upper end of said housing which is concentric to the vertical axis of said drive shaft, a flat bottom wall in said well, said drive shaft projecting upwardly beyond the plane of the upper surface of said bottom wall and being configurated to couple to appliances designed to operate at high speeds, a substantially cylindrical clutch element surrounding and journalling said drive shaft below the plane of said bottom wall, means in fixed relation to said bottom wall rotatably journalling said clutch element, said clutch element being self lubricating and having a plurality of teeth on the upper surface thereof surrounding said shaft but recessed with respect to the plane of said bottom wall, and reduction gear means interconnecting the drive shaft to said clutch element, whereby the clutch element rotates at a substantially lower rate of speed than said drive shaft for driving appliances designed to operate at a low rate of speed.

References Cited in the file of this patent

UNITED STATES PATENTS

| | | |
|---|---|---|
| 595,731 | Pengnet | Dec. 21, 1897 |
| 793,843 | Libbman | July 4, 1905 |
| 1,812,651 | Gullberg | June 30, 1931 |
| 1,823,314 | Brewer | Sept. 15, 1931 |
| 2,483,905 | Hubmann | Oct. 4, 1949 |
| 2,533,480 | Leininger et al. | Dec. 12, 1950 |
| 2,555,070 | Wood | May 29, 1951 |
| 2,616,673 | Van Guilder | Nov. 4, 1952 |
| 2,656,163 | Schwartz | Oct. 20, 1953 |
| 2,662,753 | Schwartz | Dec. 15, 1953 |
| 2,675,986 | Fisher | Apr. 20, 1954 |
| 2,744,203 | Collura | May 1, 1956 |
| 2,749,435 | Appleton | June 5, 1956 |
| 2,804,289 | Schwaneke | Aug. 27, 1957 |
| 2,807,447 | Vaughan | Sept. 24, 1957 |